Figure 1:
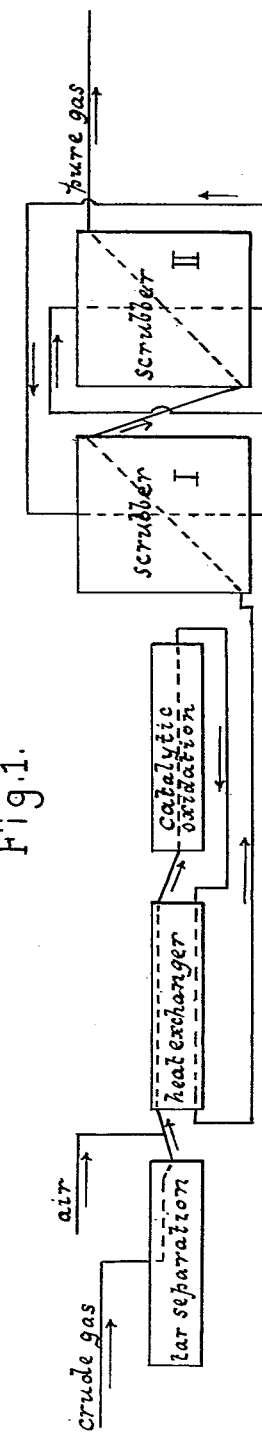

Dec. 6, 1932.  H. BAEHR  1,889,942

PURIFICATION OF SULPHUR BEARING GASES AND RECOVERY OF SULPHATES AND SULPHUR

Filed Aug. 1, 1929  2 Sheets-Sheet 1

Inventor
Hans Baehr
By his Attorneys

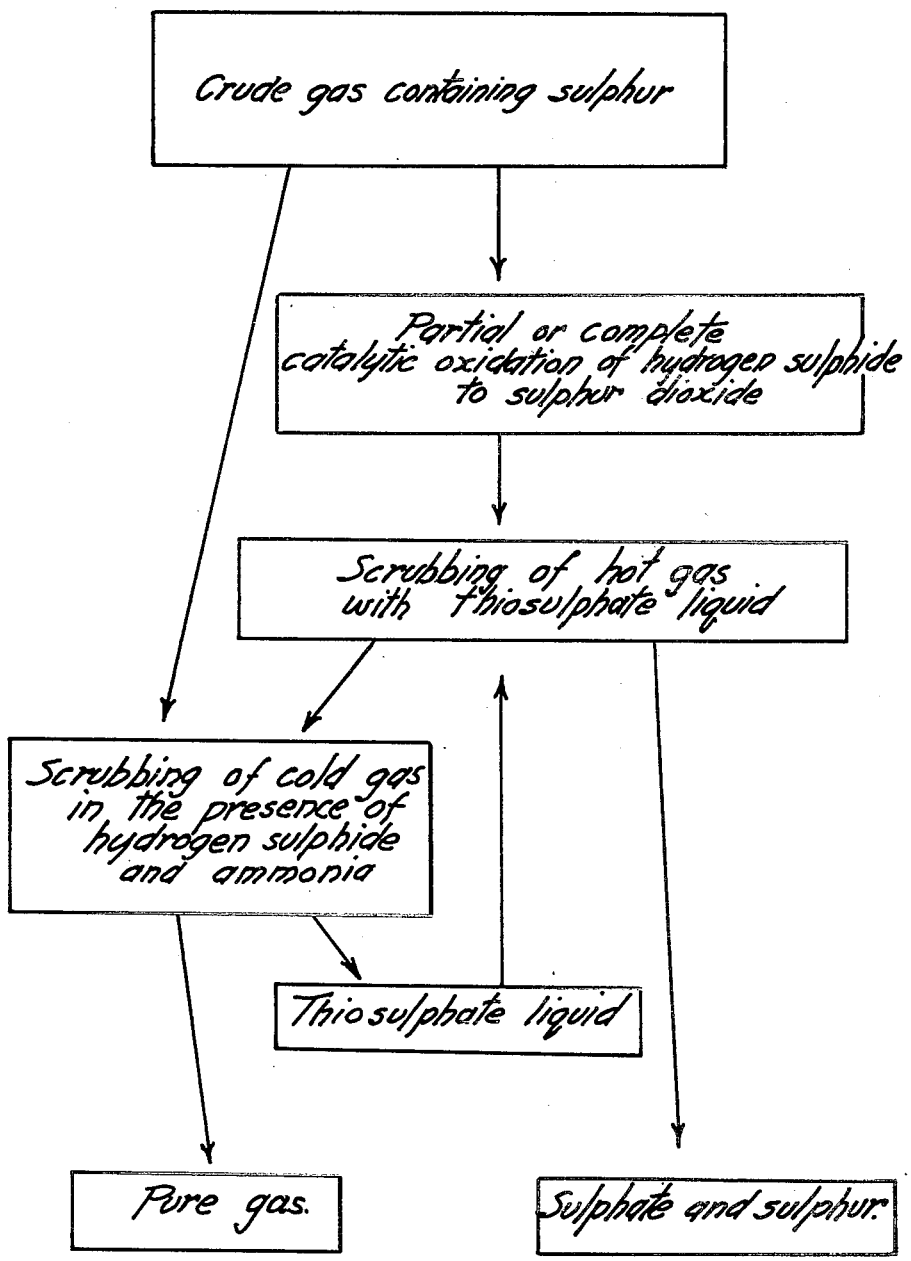

Patented Dec. 6, 1932

1,889,942

UNITED STATES PATENT OFFICE

HANS BAEHR, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PURIFICATION OF SULPHUR BEARING GASES AND RECOVERY OF SULPHATES AND SULPHUR

Application filed August 1, 1929, Serial No. 382,730, and in Germany August 27, 1928.

The present invention relates to the purification of sulphur bearing gases and recovery of sulphates and sulphur.

It is already known that the sulphur compounds which are contained as impurities in industrial gases may be converted by catalytic oxidation into oxides of sulphur and that the latter may be separated in the form of salts from the gases in a great number of ways. In this manner sulphites, which usually contain a small percentage of sulphates, are mainly obtained. The possibilities of directly using these salt mixtures rich in sulphites are limited, however, and conversion of the same into sulphates offers difficulties. It has already been proposed to convert the sulphites into sulphates by oxidation or by heating under pressure or to decompose the sulphites by means of strong acids with the recovery of sulphur dioxide, but all these polystage processes require a high cost for apparatus and operation.

Another method of removing sulphur from gases is by converting a part of the hydrogen sulphide into sulphur dioxide by catalytic oxidation and then causing the sulphur dioxide to react with the unconverted part of the hydrogen sulphide with the formation of elementary sulphur. The direct conversion of sulphur dioxide with hydrogen sulphide proceeds very slowly, however.

I have now found that sulphates and sulphur can be recovered in a simple and continuous manner in the purification of gases from sulphur by partially or completely converting the hydrogen sulphide contained in the crude gases into sulphur dioxide by catalytic oxidation and by then bringing the hot gases which contain sulphur dioxide, and which may also contain ammonia, into contact with a liquid containing thiosulphates. In this manner sulphates and sulphur are formed from the thiosulphates.

The liquid containing thiosulphates can be obtained by scrubbing the gases, which are cooled after having been treated with the thiosulphate liquid and pass on and which still contain sulphur dioxide and, according to the degree of the previous oxidation, possibly also hydrogen sulphide. If, however, there is no hydrogen sulphide present, a gas containing the same is added thereto. It is preferable to employ as the scrubbing liquid for the second scrubbing the thiosulphate liquid which remains after the first scrubbing of the gases and which is not yet sufficiently enriched with sulphates and sulphur. When the liquid is sufficiently enriched with sulphates and sulphur it can be worked up in the usual manner to give solid sulphates and sulphur.

The principal features of the process according to the present invention are diagrammatically illustrated in Fig. 3 of the accompanying flow sheets, which illustration will require no further explanations.

The details of the process may be carried out in various ways. Several modifications of the process are given in the following examples. In many cases, in particular when large quantities of thiosulphate liquid are obtained, the superfluous part of the thiosulphate liquid can be separated off and worked up by itself into sulphur and sulphates.

In order to obtain a liquid containing thiosulphates which may be readily converted into sulphate and sulphur it is recommended that hydrogen sulphide and sulphur dioxide should be employed in the proportions of from 10 to 12 molecular proportions of ammonia, from 2 to 6 molecular proportions of hydrogen sulphide, and from 8 to 11 molecular proportions of sulphur dioxide. In this manner a readily convertible liquid is obtained; for example, when the said proportions are 12 to 2 to 10, a liquid is obtained which contains 2 molecular proportions of ammonium bisulphite to each molecular proportion of ammonium thiosulphate and which by conversion yields 1 molecular proportion of sulphate for each molecular proportion of sulphur in accordance with the equation:

$$3(NH_4)_2S_2O_3 + 6NH_4HSO_3 = 6(NH_4)_2SO_4 + 3H_2O + 6S.$$

In certain cases it is desirable to alter the proportions of the sulphate and the sulphur which are to be obtained. This may be effected by suitable choice of the proportions of the components which react with each other, namely ammonia, sulphur dioxide and hydrogen sulphide. For example, by choosing the proportions of ammonia, sulphur dioxide and hydrogen sulphide equal to 12 to 10 to 4, a liquid which contains 3 molecular proportions of sulphurous acid, or the corresponding quantity of ammonium polythionate, to each molecular proportion of ammonium thiosulphate, is obtained. From this liquid 3 molecular proportions of sulphur to each 2 molecular proportions of sulphate are obtained in accordance with the following equations:

$$6(NH_4)_2S_2O_3 + 3SO_2 = 6(NH_4)_2SO_4 + 9S$$

$$4(NH_4)_2S_2O_3 + (NH_4)_2S_3O_6 + (NH_4)_2S_4O_6 = 6(NH_4)_2SO_4 + 9S$$

For carrying out the process in accordance with the present invention it is immaterial whether the separate components which are necessary for the formation of the liquids are washed out all together or one after another, and similarly one or other of the components may be added to the gases or the scrubbing liquid at any place and may be added all at once or in several portions.

Since the catalytic oxidation of the hydrogen sulphide to sulphur dioxide according to the process herein described is carried out within the current of the gases itself, nitrogen is introduced into the gas together with the air which is added for the catalytic oxidation and in certain cases this is undesirable. The oxidation of the hydrogen sulphide necessitates a preheating of the gases to about 300° C. and this may be effected by regeneration of the heat of the gases leaving the catalyst. The unavoidable loss of heat which thus occurs can be compensated for by the heat disengaged in the oxidation, provided the gases contain more than about 5 grams of hydrogen sulphide per cubic meter. Gases which have a smaller content of hydrogen sulphide require an additional heating in order to preheat them to the reaction temperature and this entails extra expense.

It has been found that the desulphurization of gases which either have a small content of hydrogen sulphide or which must not be diluted with the nitrogen of the air added for the combustion, can be effected in a simple manner by scrubbing the gases with a liquid containing ammonium sulphite and bisulphite or polythionates, and by separately treating the liquid which then contains thiosulphates and in some cases polythionates with another current of gas which is detached from the first mentioned main current or which arises from another source and in which the hydrogen sulphide has been converted into sulphur dioxide by catalytic oxidation. By washing out the sulphur dioxide first from the hot gas obtained from said oxidation with the thiosulphate liquid resulting from the removal of the hydrogen sulphide from the first-mentioned gas current, sulphate and sulphur are formed, whereas the remainder of the sulphur dioxide is removed from the cool gas in the presence of a sufficient quantity of ammonia a scrubbing liquid containing ammonium sulphite and bisulphite or a polythionate liquid is obtained, which may serve for scrubbing the other gas current so that the alternate scrubbing of the gases containing hydrogen sulphide and sulphur dioxide causes an increase in the concentration of the thio salts. By this manner of working mixing of the two gas currents to be purified does not take place.

In each case the fraction of hydrogen sulphide which is to be oxidized catalytically, must be calculated according to the quantities of the gases to be worked up and according to their content of sulphur compounds. When the quantity of hydrogen sulphide in the gases which is not to be treated catalytically is less than the quantity which is necessary for the conversion of the catalytically produced sulphur dioxide in the other gases into thiosulphates, then the catalytic conversion of the hydrogen sulphide is only carried out in part so that the proportions of the hydrogen sulphide and sulphur dioxide which are necessary for the formation of thiosulphate are obtained. In the contrary case, when the quantity of sulphur dioxide is not sufficient for the formation of thiosulphate, the quantity which is lacking may be made up for from any suitable source.

The standardization of the proportions of the components which are to be brought into reaction one with the other, namely of the quantities of ammonia, sulphur dioxide and hydrogen sulphide depends on the nature of the final liquid which it is desired to produce. For example if it is desired to produce a liquid containing thiosulphate and bisulphite which can be directly converted into sulphate and sulphur by heating, the proportions of ammonia, sulphur dioxide and hydrogen sulphide are kept in the ratio of 12 to 11 to 2. If on the contrary it is desired to obtain a liquid containing thiosulphate and polythionate which can also be directly converted by heating, the said components are brought together in the ratio of 12 to 11 to 4. Again, if it is desired to produce a liquid which contains thiosulphate alone, the said ratio must be maintained equal to 12 to 8 to 4.

The following examples will further illustrate how my invention may be carried out in practice, but the invention is not restricted to these examples. In connection with these examples, Figures 1 and 2 of the accompanying flow sheets will be referred to.

*Example 1*

The main steps of the process described in this example are illustrated in Figure 1 of the accompanying flow sheets.

Crude illuminating gas having a content of 8 grams of hydrogen sulphide and 7 grams of ammonia per cubic meter is freed from tar by cooling to about 25° C. and then, after the addition of from 7 to 8 per cent by volume of air, is preheated to about 280° C. in a heat exchanger with a hot gas which has already been obtained in the process. The preheated gas is then led over one of the oxidation catalysts already known, for example over activated nickel, and in this manner the hydrogen sulphide is converted into sulphur dioxide and the temperature of the gas rises to about 400° C. After the greater part of the heat of the effluent gas has been given up to cold initial gas in the heat exchanger the gas, now at about 120° C., is passed into the scrubber I which is showered with a liquid containing thiosulphate. From the liquid obtained in the tar separation, the ammonia which is present therein is expelled and is added at a suitable place to the gas or to the scrubbing liquid. The said liquid containing thiosulphate, the preparation of which is hereinafter more fully described, is heated by the gas and the conversion of the thiosulphate, as well as of any thionate present, into sulphate and sulphur takes place. A small part of the ammonia and the sulphur dioxide is converted into sulphate in the scrubber I, but the greater part passes with the gas current into the scrubber II. This scrubber is showered with a liquid drawn off from the first scrubber I and containing sulphate and free sulphur, and in this manner the remaining sulphur dioxide and the ammonia form ammonium thiosulphate with the sulphur. The liquid then passes into the scrubber I and is there decomposed, and then, in some cases after previous cooling, is again employed for showering in the scrubber II. This proceeds until the liquid is sufficiently enriched with sulphate. If necessary a cooler for the gases may be arranged between the first and second scrubbers.

If the washing liquid is saturated with sulphate, solid sulphate is precipitated in the second scrubber by the absorption of ammonia and sulphur dioxide. This, together with a part of the sulphur which separates out at the same time, may be removed from the solution while the mother liquor which contains thiosulphate and some sulphite and bisulphite is returned into circulation. Obviously the liquid may also be withdrawn before the saturation point is attained and may be worked up into sulphate by evaporation.

In order to increase the quantity of thiosulphate in the liquid leaving the scrubber II, the liquid may be led into a container with the further addition of sulphur where it is heated to about 90° C. The liquid thus obtained is then led into the first scrubber.

*Example 2*

The procedure according to this example is also explained by Figure 1 of the accompanying flow-sheets.

Producer gas obtained from brown coal containing 12 grams of hydrogen sulphide per cubic meter, is freed from tar in the usual manner and is preheated in a heat exchanger to about 200° C. with the hot gas coming from the oxidation catalyst in a previous operation. About 5 per cent by volume of air is then added and the gas is led over the oxidation catalyst. The quantity of oxygen in the added air corresponds to $2/3$ of the quantity necessary for the oxidation into sulphur dioxide of the entire quantity of hydrogen sulphide contained in the gas, so that in the gas after leaving the catalyst $2/3$ of the original hydrogen sulphide is present in the form of sulphur dioxide and $1/3$ in the form of unchanged hydrogen sulphide in addition to small quantities of sulphur. After this gas has been cooled to about 120° C. in the heat exchanger it is passed into the first scrubber I which is showered with a liquid containing thiosulphate and sulphite or bisulphite obtainable from the second scrubber II. The thiosulphate is converted into sulphate and sulphur by the hot gas containing sulphur dioxide, and also part of the sulphur dioxide enters into reaction with the hydrogen sulphide with the formation of sulphur. The hot liquid leaving the first scrubber I is cooled and serves for showering in the second scrubber II after passing in the amount of ammonia necessary for combination with the sulphur dioxide. The remainder of the sulphur dioxide and the hydrogen sulphide are removed from the gas by conversion in the second scrubber II.

As soon as the liquid leaving the first scrubber is saturated with sulphate, a part of the same is drawn off and, after filtering off the sulphur, is evaporated until the sulphate crystallizes.

*Example 3*

Figure 2:
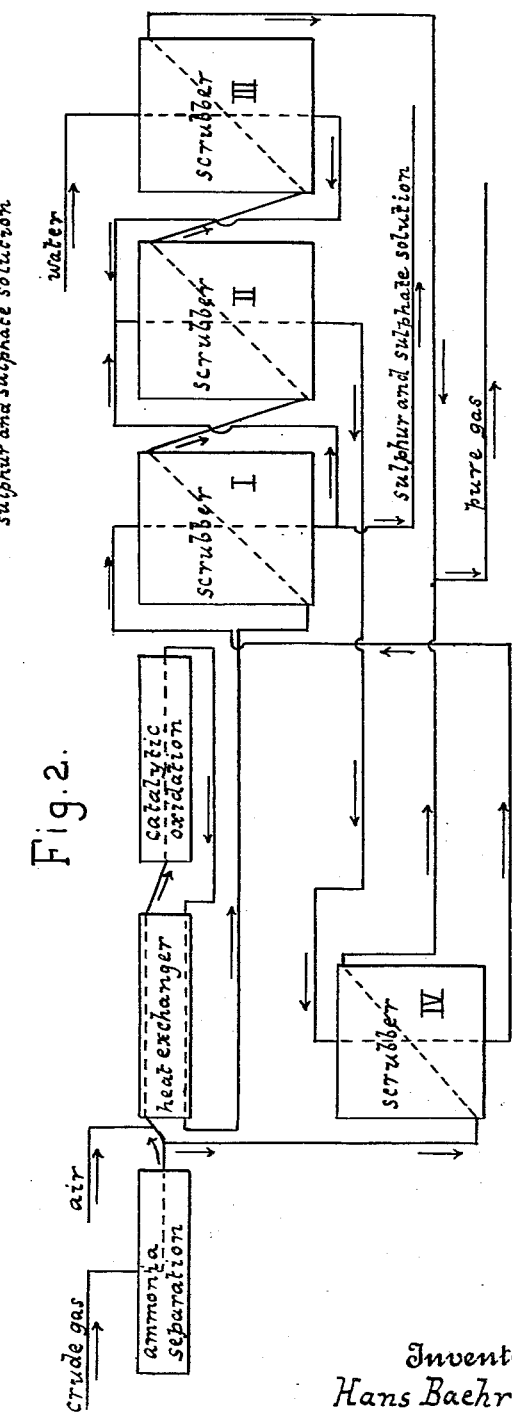

The procedure according to this example is illustrated in Figure 2 of the accompanying flow-sheets.

Coke oven gas containing about 8 grams of hydrogen sulphide and 7 grams of ammonia per cubic meter is divided into two branch currents in the proportion of 2 to 1, after cooling and washing out a part or the whole of the ammonia.

The larger branch current of the said gas is heated to about 280° C. after the addition of from 6 to 7 per cent by volume of air, by means of a heat exchanger and is then led over an oxidation catalyst. The effluent gases, the temperature of which amounts to 400° C. by reason of the heat of reaction, are cooled in the heat exchanger to about 120° C. and then pass into a first scrubber I which is showered with a liquid containing thiosulphate. The thiosulphate is decomposed in contact with the sulphurous acid which is present in the hot gases, with the formation of sulphate and sulphur, and then according to its concentration the solution is either worked up into sulphate and sulphur or is led back into the operation as the absorption liquid.

The greater part of the sulphur dioxide remains in the gas current and by further scrubbing in the scrubber II with the liquid containing sulphate obtained from the scrubber I, if necessary after the addition of ammonia, the sulphur dioxide is recovered in the form of a liquid containing sulphite and bisulphite. The remaining sulphur dioxide is separated from the gas in the scrubber III, if necessary after the addition of fresh ammonia, by means of water or ammonium sulphite liquid, preferably in a cycle. The resulting ammonium sulphite liquid may be employed for replenishing the liquid drawn off from the scrubber I and used in the scrubber II for scrubbing the cold gas containing sulphur dioxide which flows from the scrubber I, and is thus converted into a liquid containing sulphite and bisulphite. The smaller quantity of the initial gas is scrubbed in the scrubber IV with the liquid containing sulphite and bisulphite which has been prepared by absorption of the sulphur dioxide in the scrubber II. This liquid containing sulphite and bisulphite absorbs the hydrogen sulphide and the ammonia which is present or which has been added with the formation of a liquid containing thiosulphate. This is then supplied as scrubbing liquid to the scrubber I.

What I claim is:

1. The process of recovering sulphur and ammonium sulphate from gases containing hydrogen sulphide, which comprises catalytically oxidizing at least part of the hydrogen sulphide contained in said said gases, scrubbing the hot gas with a solution comprising ammonium thiosulphate, thereby converting the thiosulphate into sulphur and ammonium sulphate, freeing the resulting gas, while cool, from sulphur dioxide by scrubbing in the presence of hydrogen sulphide and ammonia, and employing the resulting solution again for the first scrubbing operation.

2. The process of recovering sulphur and ammonium sulphate from gases containing hydrogen sulphide, which comprises catalytically oxidizing at least part of the hydrogen sulphide contained in said gases, scrubbing the hot gas with a solution comprising ammonium thiosulphate, thereby converting the thiosulphate into sulphur and ammonium sulphate, freeing the resulting gas, while cool, from sulphur dioxide by scrubbing in the presence of hydrogen sulphide and ammonia with dilute scrubbing liquid from the first scrubbing operation, and employing the resulting solution again for the first scrubbing operation.

3. The process of recovering sulphur and ammonium sulphate from gases containing hydrogen sulphide, which comprises catalytically oxidizing at least part of the hydrogen sulphide contained in said gases, scrubbing the hot gas with a solution comprising ammonium thiosulphate, thereby converting the thiosulphate into sulphur and ammonium sulphate, freeing the resulting gas while cool from sulphur dioxide by scrubbing in the presence of hydrogen sulphide and ammonia with dilute scrubbing liquid from the first scrubbing operation, scrubbing another portion of the crude initial gas with the resulting scrubbing liquid, and employing the resulting solution again for the first scrubbing operation.

4. The process of recovering sulphur and ammonium sulphate from gases containing hydrogen sulphide, which comprises catalytically oxidizing at least part of the hydrogen sulphide contained in said gases, scrubbing the hot gas with a solution comprising ammonium thiosulphate, thereby converting the thiosulphate into sulphur and ammonium sulphate, adding to the resulting gas a gas containing hydrogen sulphide, freeing the resulting gas, while cool, from sulphur dioxide by scrubbing in the presence of hydrogen sulphide and ammonia, and employing the resulting solution again for the first scrubbing operation.

5. The process of recovering sulphur and ammonium sulphate from gases containing hydrogen sulphide, which comprises catalytically oxidizing at least part of the hydrogen sulphide contained in said gases, scrubbing the hot gas with a solution comprising ammonium thiosulphate, thereby converting the thiosulphate into sulphur and ammonium sulphate, adding to the resulting gas another portion of the crude initial gas containing hydrogen sulphide, freeing the resulting gas, while cool, from sulphur dioxide by scrubbing in the presence of hydrogen sulphide and ammonia, and employing the resulting solution again for the first scrubbing operation.

6. The process of recovering sulphur and ammonium sulphate from gases containing hydrogen sulphide, which comprises catalytically oxidizing at least part of the hydrogen sulphide contained in said gases, scrubbing the hot gas with a solution comprising ammonium thiosulphate, thereby converting the thiosulphate into sulphur and ammonium sulphate, freeing the resulting gas, while cool, from sulphur dioxide by scrubbing in the presence of hydrogen sulphide and ammonia with dilute scrubbing liquid from the first scrubbing operation, scrubbing a gas containing hydrogen sulphide with the resulting scrubbing liquid, and employing the resulting solution again for the first scrubbing operation.

In testimony whereof I have hereunto set my hand.

HANS BAEHR.